Oct. 3, 1967  W. H. SCHMELING ET AL  3,345,556
ENERGIZING CIRCUIT FOR POSITIONING SYSTEM TRANSDUCER
Filed April 8, 1964  2 Sheets-Sheet 1
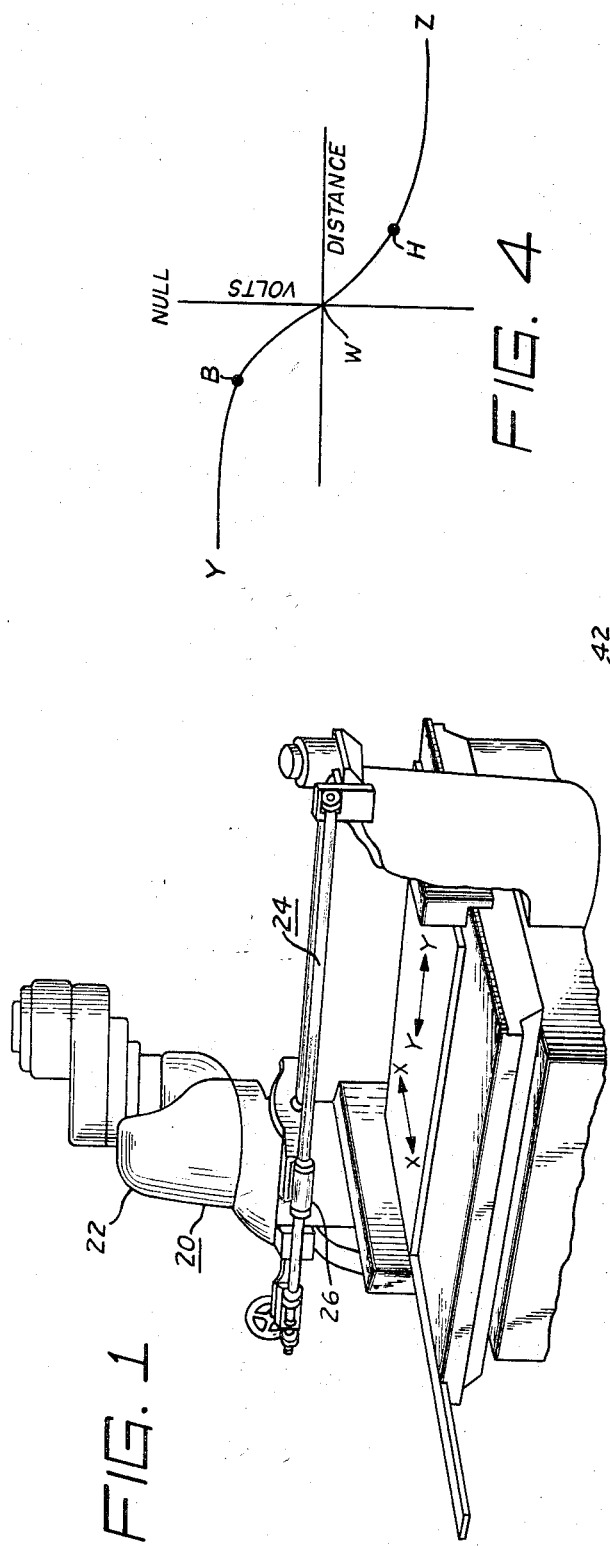
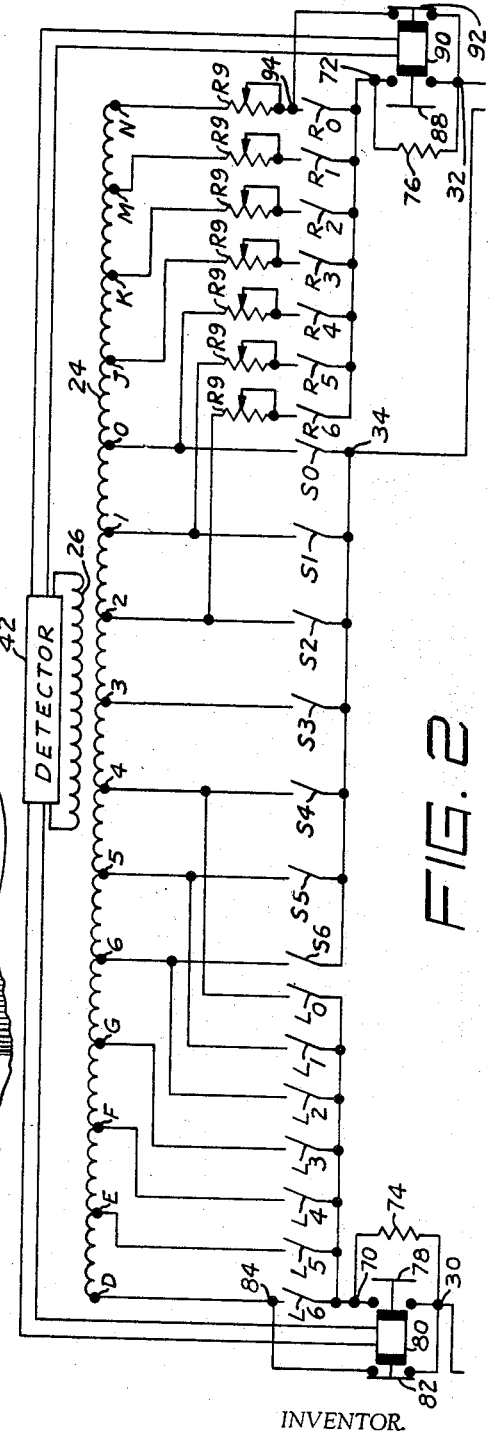
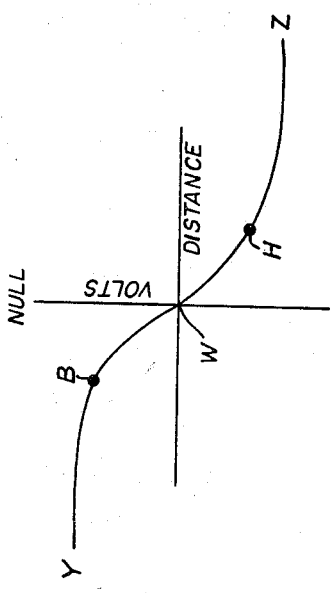
INVENTOR.
WILLIAM H. SCHMELING
ROBERT E. MACHEREY
BY William H Schmeling

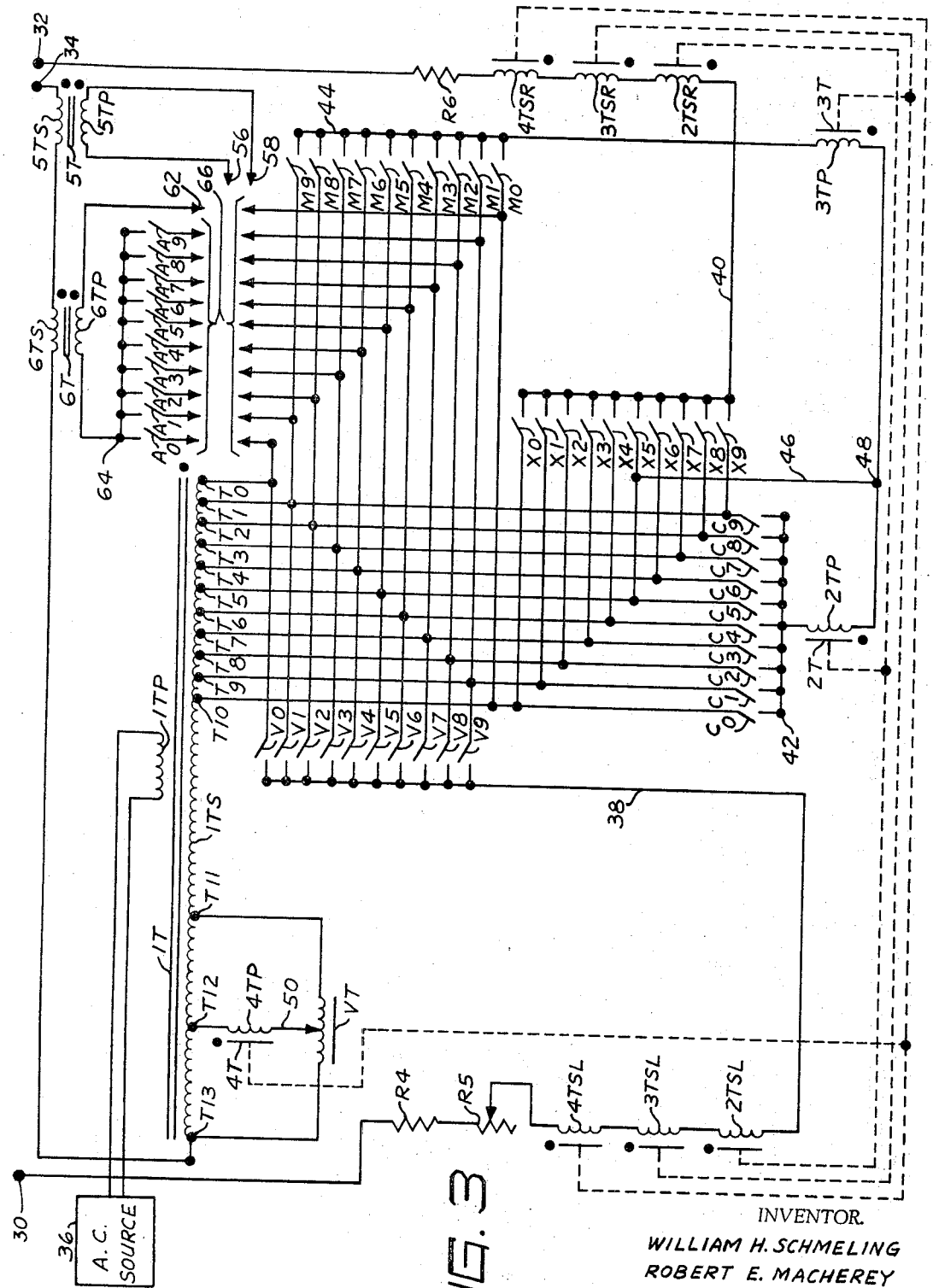

3,345,556
ENERGIZING CIRCUIT FOR POSITIONING SYSTEM TRANSDUCER
William H. Schmeling, Wauwatosa, and Robert E. Macherey, Mequon, Wis., assignors to Square D Company, Park Ridge, Ill., a corporation of Michigan
Filed Apr. 8, 1964, Ser. No. 358,325
12 Claims. (Cl. 323—43.5)

ABSTRACT OF THE DISCLOSURE

A circuit for controlling the energization of a multi-tap primary winding of a positioning transducer that has a secondary winding inductively coupled thereto to provide an output signal depending upon the displacement of the secondary winding relative to a selected tap on the primary winding so equal length sections of the primary winding on opposite sides of any selected tap are energized with input signal voltages having ratios which may be varied in discrete increments to equalize the impedance of the primary winding to the input signals and the inductive coupling between the sections of the primary winding and the secondary winding in spite of variations of the supply for the input signal.

---

This invention relates to positioning control systems and is more particularly concerned with a system for precisely indicating the relative positions of two relatively movable members.

The present invention is basically concerned with an apparatus and system which will indicate the relative position of a member relative to a reference and is particularly suited for use with various production machines, such as machine tools, conveyors, gages and the like, where it frequently is necessary to determine when two relatively movable members are in a precise, predetermined position relative to each other. The positioning system according to the present invention will determine the relative position of a member in a predetermined path of travel, whether the path of travel be a straight or a curved line, and to that extent, the system may be construed as measuring linearly. The system is noncyclic, because it will continuously indicate the direction of displacement of a member from a predetermined point; and is static in nature because it may be constructed without moving contacts or other wearing parts.

The present invention is directed to certain improvements in a basic control system is disclosed and claimed in a United States Patent No. 2,962,652, which was granted to Leander J. Bulliet on Nov. 29, 1960. The system as disclosed by Bulliet includes an elongated primary winding hereinafter called "primary," which is energized from a single phase source of alternating current. The wire convolutions of the primary are preferably wound on a support of nonferrous material and is provided with a pair of input terminals adjacent its ends. Located at spaced predetermined intervals, e.g., one inch intervals, along the primary between the input terminals, are spaced taps which in turn are connected to a selector switch. When both of the input terminals of the primary are connected to one of the terminals of a single phase alternating current source and any one of the taps is connected through a selector switch to the other terminal of the source, alternating current will flow in opposite directions in the two sections of the primary defined by the terminals at the ends of the coil and the selected tap. When the current thus flows through the sections, the voltage in the sections will be 180° out of phase from each other and the current flow in the sections will be in opposite directions.

The basic control system also includes a secondary coil, hereinafter called "secondary." The secondary is mounted so that the primary and secondary are relatively movable. The secondary is inductively coupled with the primary and is provided with a pair of output terminals across which the voltage induced in the secondary by the primary will be impressed.

It has been previously stated that current flows in opposite directions in the sections of the primary which extend in opposite directions from the selected tap. Thus, theoretically, if the secondary is centered at the selected tap, the voltages induced therein by the turns of the primary extending respectively in opposite directions of the selected tap are equal and opposite and the output of the secondary will be zero. When the secondary is displaced from its centered position, the section of the primary toward which the secondary is displaced will have its inductive coupling increased while the section of the primary from which the secondary was displaced will have its coupling decreased. When the secondary is thus displaced, the voltages induced therein by the respective primary sections will no longer be equal and opposite and a resultant voltage will appear at the output terminals of the secondary, the phase of which indicates the direction of the displacement.

In United States Patent No. 3,244,956, filed on February 7, 1963, as a continuation of a later abandoned application Ser. No. 842,001 which was filed on Sept. 24, 1959, the inventor Robert C. Mierendorf, who assigned both applications to the assignee of the present invention, disclosed that an absolute null voltage output of the secondary was not realized when the secondary is accurately positioned over the selected tap. Mierendorf further observed that the voltages induced in the secondary were not symmetrical and a minimum secondary output signal continuously existed which varies in phase and amplitude as the various taps on the primary coil are selected and that wave form distortions or harmonics were introduced in the secondary output from the primary and from other sources.

Further, the basic system as disclosed by Bulliet, required that either the primary or secondary coils be physically displaced by a micrometer vernier adjustment to provide the zero offset for the apparatus. This feature was added so that the apparatus would be calibrated to the machine to which it was attached, or when a part was positioned on the machine to which the positioning system is attached, so that the measuring system could be displaced to compensate for displacements of the part on the machine.

The present invention is directed to certain improvements in the positioning systems disclosed by Bulliet and Mierendorf and includes an arrangement whereby accurate positioning of the secondary at points intermediate the taps on the primary is accomplished without being affected by variations in the supply voltage and an arrangement whereby changes in the currents in the primary winding are used to accomplish the zero offset of the system so as to eliminate the requirements of the mechanical adjustment of Bulliet and to provide a less sophisticated arrangement for accomplishing the result as disclosed by Mierendorf. The present invention also includes an arrangement which employs a system for switching the energizing leads to the end terminals of the primary as the secondary approaches a predetermined position so the sections of the primary on opposite sides of the tap selected to provide the predetermined position will be equal to thereby compensate for the variations in inductive coupling between the primary and secondary when the secondary is positioned at a location removed from the center of the primary winding. This switching arrangement eliminates the less sensitive and more costly pair of precision tapped transformers which were employed by Mierendorf to accomplish the result.

It is an object therefore of the present invention to provide a position indicating system which will incorporate the features above discussed.

Another object of the present invention is to provide a position indicating system which includes an elongated primary winding and a secondary winding which is axially movable relative to the primary winding and inductively coupled thereto to have an alternating voltage induced therein by the primary winding and to provide the primary winding with selectable spaced taps which are located between the end terminals on the primary winding thereby dividing the primary into two sections of varying predetermined lengths which sections will have variable inductive coupling with the secondary coil depending on which tap is selected, with a system for switching the energizing leads to the end terminals of the primary as the secondary approaches a predetermined position, so the sections of the primary on opposite sides of the tap selected to provide the predetermined position will be equal to thereby equalize the inductive coupling of said sections to maintain the voltages induced in the secondary winding by the respective sections symmetrical.

A further object of the present invention is to provide a position indicating system which includes a multitap primary winding and a secondary winding which is inductively coupled thereto with a means which will equalize the impedance across the two sections of the primary winding, said sections being defined as the portions of the primary winding which extend an equal distance in opposite directions from any one of the taps of the primary winding with a means which will selectively vary the voltage inversely across the sections in discreet steps, whereby the ratios of the voltages induced by the respective sections in the secondary winding will be constant in spite of variations in the supply voltage.

It is still another object of the present invention to provide a position indicating system which includes a mutitap primary winding and a secondary winding which is inductively coupled and movable axially relative to the primary winding with a switching means which will maintain the inductive coupling between the two sections of the primary winding and the secondary winding equal, regardless of which tap is selected, and a means for selectively and inversely varying the ratio of current flow in the sections of the primary winding independently of voltage variations of the source and a means for selectively changing current flows in the sections of the primary winding to accomplish a zero offset function of the system.

Another object of the present invention is to provide a position indicating system which includes a multitap primary winding and a secondary winding which is inductively coupled thereto with a switching circuit which will initially cause both end terminals of the primary winding to be energized from the same side of a single phase alternating current source when the secondary winding is displaced a predetermined distance from a tap on the primary which is selected and connected to the other side of the alternating current source, which switching circuit will interrupt the circuit to the end terminals and connect the taps on opposite sides of the selected tap which are equidistant from the selected tap to the side of the source which was formerly connected to the end terminals when the displacement of the secondary winding from the selected tap is less than a predetermined distance.

Further objects and features of the invention will be readily apparent to those skilled in the art from the specification and appended drawings illustrating certain preferred embodiments in which:

FIG. 1 is a perspective view of a vertical drilling machine to which the present invention may be applied.

FIGS. 2 and 3 show a schematic wiring diagram of the circuitry incorpoarting the features of the present invention.

FIG. 4 graphically illustrates the changes in the output voltage signal as the secondary winding approaches a selected position on the primary winding.

Referring now to the drawings, and to FIG. 1 particularly, there will be seen a single vertical spindle drilling machine of the type well known in the art, indicated by the numeral 20. The drilling machine includes a spindle head 22 mounted on a crossrail, and movable in the direction marked Y—Y. The spindle head 22 is preferably movable by means of a lead screw (not shown), but also could be moved by suitable hydraulic means. The machine 20 further has a worktable to which work pieces may be secured by suitable means, such as screws, two clamps, etc., not shown. The worktable is movable in the direction indicated as X—X in FIG. 1, and may be moved by a lead screw driven by an electric motor or other suitable driving means, such as hydraulic means. The specific structure for effecting the movement in the X—X and Y—Y directions is not shown since this is well known in the art. In the conventional construction of the machine, each slide motion is provided with a scale for vernier reading to thousandths of an inch. Accordingly, the spindle centerline can be positioned to any desired location over the worktable and hence, over the surface of the workpiece by setting of the X and Y dimensions on the respective scales.

Such positioning by scale reading is time consuming, and, to some extent, difficult. It is necessary for the operator to position himself next to the location of the scale and then to "sort out" the inch marks visually. The operator must further read the tenths, hundredths and vernier marks. Accordingly, as set forth immediately hereinafter, the machine has been modified to incorporate the electrical measuring or positioning system according to the present invention. The devices for measuring or positioning in the Y—Y direction are shown and hereinafter described. It will be understood that the devices are duplicated for positioning in the X—X direction.

The position indicating device as used with the present invention comprises a primary winding 24 and a secondary winding 26. The primary winding 24 comprises a continuous wire which is wound to form a great many turns which are suitably supported and preferably extend across the width of the machine 20, as in FIG. 1. A support for the convolutions of the primary which is not specifically shown, preferably is of nonferrous material, such as a polystyrene rod or aluminum tube which will not sag with age and, if possible, will have a coefficient of expansion which approximates the materials of the machine to which the support is attached. This will minimize the effects of temperature variations in the positioning system.

As shown in FIG. 2, the primary winding 24 is provided with a plurality of taps indicated by numerals 6–0 and letters D, E, F and G on the left end and J, K, M and N on the right end. The taps 0–6 and D, E, F, G, J, K, M and N are typically positioned at every inch along the primary, which is likely to be several feet in length. Thus the number of taps shown in FIG. 2 is illustrative, but not necessarily representative. The taps D and N on the left and right ends of the primary winding 24 act as end terminals for the primary winding 24. Each of the taps N, M, K, J and 0–2 is connected to one side of a normally open switch respectively designated as switches R0–R6. The taps 0–6 are each connected to one side of a normally open switch respectively designated as switches S0–S6 and the taps 4–6 and G, F, E and D are each respectively connected to one side of a normally open switch which are respectively designated as switches L0–L6. The other side of each of the switches S0–S6 is connected through a common bus to junction 34. Similarly, the other side of each of the switches L0–L6 is connected through a common bus to a junction 70 and the other side of each of the switches R0–R6 is connected through a common bus to a junction 72. A resistor 74 is connected between the junction 70 and a junction 30 and a similar resistor 76 is connected between the junction 72 and a junction 32. The junction 70 is connectible to the junction 30 through the normally open contacts 78 of a relay 80 which has a pair of normally closed contacts 82 included in a circuit between the junction 30 and a junction 84 which is included in the connection between the switch L6 and the end tap or terminal D. The junction 72 is connected to the junction 32 through the normally open contacts 88 of a relay 90 which has a pair of normally closed contacts 92 included in a circuit between the junction 32 and a junction 94 which is included in the connection between the switch R0 and the end tap or terminal N. An adjustable resistor R9 is included in each of the circuits between the switches R0–R6 and taps N, M, K, J and 0–2 with the resistor R9 in circuit with switch R0 connected between the junction 94 and tap N.

The relays 80 and 90 are arranged so contacts 82 and 92 are closed and contacts 78 and 88 are open when the relays are de-energized. The relays 80 and 90 are energized in response to an output from a detector 42, as will be later explained. The switches S0–S6, L0–L6, and R0–R6 each have normally open switch contacts and in actual practice may be part of a selector switch arrangement which is arranged so only one switch of each set of switches can be closed at any time and the corresponding switches of each set close with one another. For example, switch L0 closes with S0 and R0, L1 closes with S1 and R1, etc.

A single phase alternating current souce 36, shown in FIG. 3, is connected to energize a primary winding 1TP of a transformer 1T which has a secondary winding 1TS. The source 36, which may be of any conventional type, preferably is arranged to supply a substantially constant voltage at frequencies higher than 60 cycles or multiples thereof. This will minimize the effects on the control system from the undesirable influences of voltage signals which may be generated by other electrical equipment operating in the vicinity of the positioning system herein described. An example of a frequency herein contemplated is a frequency of 400 cycles.

The secondary winding 1TS is provided with a plurality of accurately located taps T0–T13, as shown. The sections of the secondary winding 1TS between taps T0–T1, T1–T2, etc., through T10 are each arranged to provide an alternating voltage of two volts between the adjacent taps. The section of the secondary winding 1TS between taps T10–T11 is arranged to provide a voltage of twenty volts and the portions of the secondary winding 1TS between taps T11–T12 and T12–T13 are each arranged to provide a voltage of ten volts between taps T11–T12 and a similar voltage of ten volts between taps T12–T13. The taps T0 through T9 are respectively connected through a plurality of normally open switches V0–V9 to a lead 38. Similarly, the taps T10 through T1 are respectively connected through a plurality of normally open switches X0 through X9 to a lead 40. The taps T10 through T1 additionally are respectively connected through normally open switches C0–C9 to a common bus 42 and through normally open switches M0–M9 to a common bus 44. As will become hereinafter apparent, the switches V and X provide a tenth-inch increment, the switches C provide a hundredths-inch increment and the switches M provide a thousandths-inch increment for the system.

A lead 46 is connected between the tap T5 and a terminal 48. A primary winding 2TP of a transformer 2T is connected between the terminal 48 and the bus 42. Similarly, a primary winding 3TP of a transformer 3T is connected between the terminal 48 and the bus 44.

A variable transformer, such as a Variac VT, has one input terminal connected to tap T11 and another input terminal connected to tap T13. Connected between an input terminal 50 of the Variac VT and the tap T12 is a primary winding 4TP of a transformer 4T. Each of the transformers 2T, 3T and 4T have a pair of secondary windings respectively designated as 2TSL, 2TSR, 3TSL, 3TSR, 4TSL and 4TSR. The association between the primary and secondary windings of transformers 2T, 3T and 4T is shown by a broken line in FIG. 3.

The junction 30 is connected to lead 38 through a circuit which includes a resistor R4, an adjustable resistor R5 and the secondary windings 4TSL, 3TSL and 2TSL in which the resistors and secondary windings are connected in series with each other. Similarly, the junction 32 is connected to lead 40 by a similar series circuit which includes a resistor R6 and the secondary windings 4TSR, 3TSR and 2TSR.

The junction 34 is connected to the tap T13 by a series circuit which includes a secondary winding 5TS of a transformer 5T and a secondary winding 6TS of a transformer 6T. The transformer 5T has a primary winding 5TP which is connectible to any of the taps T0–T10, as will be hereinafter described. The transformer 6T has a primary winding 6TP. The primary winding 6TP has one input terminal directly connectible to any of the taps T0–T10 and the other input terminal selectively connectible through switches A0–A9 to the respective taps T0–T10, as will be later explained.

The apparatus shown in FIGS. 1 and 2 includes the secondary winding 26 which, in the preferred embodiment of the present invention, is mounted by a support on the machine 20 so the secondary winding 26 is co-axial to the primary winding 24 and is axially movable along the primary winding 24 without physical contact therewith. The secondary winding 26 has a plurality of turns which are inductively coupled to the primary winding 24. The ends of the secondary winding 26 are connected to a pair of output terminals which supply an input to the detector 42. The detector 42, which per se does not constitute one of the features of the present invention, is arranged to sense both the magnitude and phase of the output voltage of the secondary winding 26 and in response thereto provide suitable signals to the relays 80 and 90 and to a means, not shown, which will cause movement of the spindle head 22 to a position sensed by the secondary winding 26 as will be explained.

It will be seen that selective activation of the switches S0–S6 effectively divides the primary winding 24 into a plurality of pairs of sections of varying lengths depending on the particular switch S0–S6 which is closed. Thus, if the switch S3 is closed, the portion of the primary winding 24 extending to the left of the tap 3 and the end tap D will provide one section and the portion of the primary winding 24 extending to the right of the switch S3 to the end tap N will provide the other section. Further, it will be seen that as the switches S3–S6 are individually closed in sequence while all the remaining switches S0–S6 remain open, the length of section to the left of the closed switch S3–S6 will decrease and the length of section to the right will increase incrementally as the switches S3–S6 complete the circuits to the various taps 3–6. Also as the switches S3–S0 are individually closed in sequence while all of the remaining switches S0–S6 remain open, the length of the section of the primary winding 24 to the left of the closed switch S3–S0 will sequentially increase and the section of the primary winding 24 to the right of the closed switch will sequentially decrease as the switches S3–S0 sequentially complete the circuits to the taps 3–0. However, for each closure of the individual switches S0–S6 a pair of sections of the primary winding 24 will exist. Thus as the switches S0–S6 are closed to select the various taps 0–6, a plurality of sections of the primary winding 24 of varying predetermined lengths will be provided.

Each of the primary and secondary windings of the transformers 1T, 2T, 3T, 4T, 5T and 6T have polarities indicated by the dots at their respective ends. The ratio of the primary to secondary voltages of transformers 2T is 10 to 1, 3T is 100 to 1, 4T is 10 to 1, 5T is 5 to 1, and 6T is 50 to 1.

It is believed the operation of the circuit shown in FIG. 2 will be most readily understood from the description of the sequence used in adjusting the components of the system to cause the secondary winding 26 to provide a null or zero output signal at any desired location of the primary winding. The primary winding 24 shown in FIG. 2 will provide signals to the secondary winding 26 which will permit accurate positioning of the secondary over a length of 6.999 inches. The preferred method of adjusting the system is to begin with all of the switches S0–S6, L0–L6 and R0–R6 open, except switches S3, L3 and R3 which are closed. The Variac VT is adjusted so a zero voltage is impressed across primary winding 4TP. The primary windings 5TP and 6TP are shorted so the secondary windings 5TS and 6TS will be de-energized. The tenths switches V5 and X5, the hundredths switch C5 and the thousandths switch M5, are closed. Thus the switches S3, L3, R3, V5, X5, C5 and M5 will be set to indicate a position of 3.555 on the primary winding 24. It will be seen that when switches C5 and M5 are closed, the primary windings 2TP and 3TP are effectively shorted by lead 46 and terminal 48 so that secondary windings 2TSL, 2TSR, 3TSL and 3TSR will be de-energized. The relays 80 and 90 are energized by an external manually controllable circuit which is not shown so the contacts 82 and 92 open and the contacts 78 and 88 close. The closure of contacts 78 completes a circuit between the junction 30 and the closed switch L3 to tap G of the primary winding 24. Similarly, the closed switch contacts 88 completes a circuit between junction 32 and closed switch R3 to tap J of the primary winding 24. The leads 38 and 40, which are connected in the circuits with the junctions 30 and 32 of the primary winding 24, are connected through switches V5 and X5 to the same tap T5 of the primary winding 1TP. Thus the sections of the primary winding to the left and to the right of the tap 3 will be supplied with current from equal voltage sources. It will be seen that the tap 3 is connected through the switch S3, junction 34, secondary windings 5TS and 6TS to the tap T13 on one end of the secondary winding 1TS. Tap 3 is also connected through the portion of primary winding 24 between tap 3 and tap G, switch L3, junction 70, closed switch contacts 78, resistors R4 and R5 and transformer secondary windings 4TSL, 3TSL and 2TSL to lead 38 which is connected through switches V5 to tap T5 of the secondary winding 1TS. Similarly, tap 3 is connected through the portion of the primary winding 24 between tap 3 and tap J, resistor R9, switch R3, junction 72, closed switch contacts 88, resistor R6 and transformer secondary windings 4TSR, 3TSR and 2TSR to lead 40 which is connected through switch X5 to the same tap T5 on secondary winding 1TS. Thus as the portions of the primary winding 24 to the left, that is, between taps 3 and G, and the portion to the right of tap 3 between tap 3 and tap J are connected to the same tap T5 which is on the other end of secondary winding 1TS from tap T13, each of the sections of the primary winding 24 will be supplied 50 volts from the secondary winding 1TS. With the aforementioned switches closed the resistor R5 is adjusted so the current flow at tap G equals the current flow at the tap J.

The secondary winding 26 is then physically moved to a position so its physical center corresponds to a location of 3.555 inches on the machine 20. The primary winding 24 is then physically moved relative to the machine 20 to a position which will cause the secondary winding 26 to provide a zero or a null output signal.

The secondary winding 26 is then moved so its physical center is located at a position corresponding to 3.000 on the machine 20. The switches S3, L3, R3, V0, X0, C0 and M0 are then closed so their collective settings indicate a reading of 3.000. It will be seen that the lead 38, which is connected through switch L3 to tap G of the primary 24 is connected through switch V0 to tap T0 of secondary winding. Thus a four-inch portion of the primary winding 24 between taps 3 and G will be energized by a 60-volt source. Additionally, because of the polarities of the primary and secondary windings of transformers 2T and 3T, and because the primary windings 2TP and 3TP are energized by the ten-volt source between taps T5 and T10, the secondary windings 2TSL and 3TSL will provide an additional 1¹⁄₁₀ volts to the portion of primary winding to the left of tap 3 and the secondary windings 2TSR and 3TSR will provide an opposition voltage of 1¹⁄₁₀ volts to the portion of the secondary winding to the right of tap 3. Thus the portion to the left of tap 3 will be energized by a 61¹⁄₁₀-volt source while the portion to the right of tap 3 will be energized by a 38⁹⁄₁₀-volt source.

As previously stated, the currents in the primary winding 24 and the physical position of the secondary winding 26 and the primary winding 24 were initially adjusted so the secondary winding provided a zero output signal when equal currents were flowing in the sections of the primary winding 24 to the left and right of tap 3, and the secondary winding was positioned at 3.555 inches on the machine 20. When the switches S3, L3, R3, V0, X0, C0 and M0 are closed the portion of the primary winding 24 to the left of tap 3 is supplied by a 61¹⁄₁₀-volt source and the portion to the right of tap 3 is supplied by a 38⁹⁄₁₀-volt source so the currents in the left and right sections of the primary winding 24 are no longer equal. Thus the secondary winding 26 must be displaced to the right to balance the inductive coupling effect between the portions of the primary winding 24 to the left and right of tap 3 and the secondary winding 26, so the secondary winding 26 will provide a zero output signal. If the parameters of the primary winding 24 and the secondary winding 26 are properly selected and the foregoing voltage differences are used, the ratios of currents flowing in the left and right portions of the primary winding 24 will require that the secondary winding be positioned at the 3.000 inch position on the machine. An example of the parameters herein contemplated includes a secondary winding 24 having a length of 5 inches with 5000 turns of wire of #27AWG size having a coil diameter of 3 inches and a primary winding 24 having a diameter of 1½ inches wound with #20AWG wire to have a lead of 20 turns per inch. The foregoing example is for illustrative purposes only as other parameters including other voltage differences may be employed without departing from the spirit of operation of the positioning system herein described.

With switches S3, L3, R3, V0, X0, C0 and M0 closed to provide the voltages above described, the secondary winding 26 is then physically centered at the 3.000 position on the machine 20. Usually when the foregoing voltages are applied to the right and left portions of the primary winding 24 and the secondary winding 26 is positioned as described, the output signal of secondary winding 26 will not be zero. While all of the reasons which cause a discrepancy between the expected and actual signal from the secondary winding 26 are not understood, it is believed that some of the factors which contribute to the discrepancy of the signal from the secondary winding 26 is caused by variations in the inductive coupling between the primary winding 24 and the secondary winding 26 as the secondary winding 26 is displaced from its center position and variations in the wire arrangements and size of the secondary winding 26. The effect of these and other unknown variations are neutralized by compensating the current flow in both the right and left portions of the primary winding 24. This result is accomplished by including a means in the circuit between the selected tap and the terminal of the source to which the tap is connected for either aiding or opposing from the current flow through the tap. As shown in FIG. 3 of the drawings, these means comprise the transformers 5TP and 6TP.

The primary winding 5TP is connected through a pair of leads to a pair of terminals 56 and 58 which are indicated as arrow heads. The terminals 56 and 58 are arranged so they may be connected to any of the taps T0–T10. The secondary winding 5TS, which is supplied with current from the primary winding 5TP, is connected in circuit between the selected tap 3 on the primary winding 24 and the terminal T13 of the secondary winding 1TS. Thus depending upon the connections of terminals 56 and 58 to taps T0–T10, the secondary winding 5TS will either aid or oppose the current flow in the circuit between the selected tap 3 on the primary winding 24 and terminal T13 and the magnitude of the effect of the secondary winding 5TS may be varied by a selective connection of terminals 56 and 58 to the various taps T0–T10.

One end of the primary winding 6TP is connected through a lead to a terminal 62 which is indicated by an arrow head. The terminal 62 is arranged to be connected to any of the taps T0–T10. The other end of the primary winding 6TP is connected through a lead to a bus lead 64 which can be selectively connected through switches A0–A9 and additional lead terminals 66, indicated by arrow heads, to any tap T0–T10. The switches A0–A9 are preferably arranged to be closed respectively with the respective closure of switches V0–V9 and X0–X9. Thus the switches will close in groups as follows: A0–V0–X0, A1–V1–X1, A2–V2–X2, etc. The terminals 66 may be connected at random to any of the taps T0–T10. Thus when the switches S3, L3, R3, V0, X0, C0, M0 and A0 are closed, the terminal 66 may be connected to any one of the taps T0–T10 so the output of the secondary winding 6TS will either oppose or aid the current flow in the circuit between the tap 3 and terminal T13 to change the output signal of the secondary winding 26 to zero. When the foregoing adjustments are consummated, the primary winding 24 and secondary winding 26 will be adjusted so the secondary 26 will provide a zero or null signal at both the 3.555 and the 3.000 positions on the machine 20.

After the foregoing adjustments have been completed, the following switches are closed: S3, L3, R3, V1, X1, C0 and M0, together with switch A1, and all of the other switches are in the open position. When the foregoing switches are closed, the system is adjusted to require positioning of the secondary winding 26 at 3.100 position on the machine 20. The voltage supplied across the four inch portion of the primary winding 24 to the left of tap 3 will now be 59¹⁄₁₀ volts and the voltage supplied across the four inch portion of the primary winding 24 to the right of tap 3 will be 40⁹⁄₁₀ volts. Thus when the secondary winding 26 is accurately positioned so its physical center is located at a position corresponding to 3.100 inches on the machine 20 it is expected that the output signal from the secondary winding 26 should be zero. However because of reasons which are not completely understood, the signal output of the secondary winding 26 is not zero but some finite value. An explanation for the presence of the signal from the secondary winding 26 may be attributed to uncontrollable variations in the windings of the secondary winding 26 and the inductive coupling between the primary winding 24 and the secondary winding 26. Compensation of the deviation of the output signal from the secondary winding 26 from zero or null is accomplished by connecting the terminal 66 in circuit with the switch A1 to the proper one of the taps T0–T10 so the output of the secondary winding 6TS changes the current flow between tap 3 and terminal T13 to make the output signal of the secondary winding 26 zero. From the foregoing it is apparent that the output of the transformer 6T provides a vernier adjustment to vary the ratios of current flow through the portions of the primary winding to the right and left of tap 3 when the tenths switches V0–V9 and X0–X9 are respectively closed.

Similar compensation of the currents in the right and left portions of the primary winding 24 are made when the tenths switches V2–V9 and X2–X9 are respectively adjusted to provide settings corresponding to 3.200, 3.300, 3.400, 3.500, 3.600, 3.700, 3.800 and 3.900 with the physical center of the secondary winding 26 accurately positioned by physical measurement at the respective settings relative to the machine 20. At each of the foregoing settings the proper switches A2–A9 are closed simultaneously with the corresponding tenths switches V2–V9 and X2–X0 and the proper terminal 66 associated with the switches A2–A9 is connected to one of the taps T0–T10 to eliminate the error in the output signal of the secondary winding 26 at the respective tenth position increments of the secondary winding 26 relative to any selected tap 0–6.

When all of the adjustments heretofore described have been made it follows that the primary winding 24 circuits have to be adjusted so the secondary winding 26 will provide a zero or null signal when the secondary winding 26 is positioned at the following locations relative to the machine: 3.000, 3.100, 3.200, 3.300, 3.400, 3.500, 3.555, 3.600, 3.700, 3.800 and 3.900.

Further adjustment of the resistors R9 will now be explained. It has been discovered that as the various taps 0–6 on the primary winding 24 are selected to require positioning of the secondary winding 26 at the various positions, an error in the output signal from the secondary winding 26 occurs. This error in the output signal of the secondary winding 26 is believed to be caused by an unequal current flow in the portions because of the unequal resistances of the portions and an unequal flux distribution between the lengths of the primary winding 24 and the secondary winding 26. These effects are most pronounced when a tap adjacent the respective ends of the primary winding 24 is connected to require positioning of the secondary winding 26 at a location adjacent the ends of the primary winding 24. For example, if switch 6 is closed to require positioning of the secondary winding 26 at some location intermediate 6.000 and 6.999, it will be seen that the portion of the primary winding 24 to the left of tap 6 will be shorter than the portion of the primary winding 24 to the right of tap 6. Thus one portion of the primary winding 24 will have a greater magnetic flux path and a greater resistance path than the other portion. The resistors R9 are included in the circuit to compensate for the unequal distribution of fluxes and resistances of the primary winding 24 as the various taps 0–6 are selected for positioning of the secondary winding 26.

After the adjustment of the components of the system has been accomplished so the secondary winding 26 will provide a zero or null output signal at any of the tenths inch positions between 3.000–3.900, the switches S4, L4 and R4 are closed. The tenths switches V5 and X5, the hundredths switch C5, thousandths switch M5 and the switch A5 are closed with all of the remaining switches open to thus provide a setting of 4.555 inches as was previously described in connection with the 3.555-inch setting. The secondary winding 26 is then accurately positioned by physical measurement so it is physically centered at the 4.555-inch position on the machine 20. When the foregoing switches are closed to provide a setting of 4.555 inches and the secondary winding 26 is accurately positioned at the 4.555-inch location, the secondary winding 26 can be expected to provide an error output signal other than zero. This error output signal is eliminated by adjustment of the resistor R9 which is located in circuit with switch R4 so that the output signal of the secondary winding 26 becomes zero.

It follows that a similar adjustment of the resistors R9 in circuit with each of the switches 0, 1, 2, 5 and 6 will cause the secondary winding 26 to provide a zero or null signal at 0.555, 1.555, 2.555, 4.555, 5.555, and 6.555. Further, as the switches A0–A9 which were previously circuited with the proper taps T0–T10 to cause the transformer 6T to compensate the output signal of the secondary winding at each tenth inch increment between 3.000 and 3.900 and as the switches A0–A9 are each closed simultaneously with the respective closure of switches V0–V9 and X0–X9, it follows that a similar accuracy at the 1/10-inch points between the taps 0–6 will be achieved.

It will be seen from the foregoing that when the primary winding 24 is energized to require positioning of the secondary winding 26 at any of the X.555 positions, where X designates the closure of the switches S0–S6 or inch switch, the four-inch portions of the primary winding 24 to the right and left of the selected tap in circuit with switches S0–S6 each will be energized by a 50-volt source. Further when the currents in the primary winding 24 are adjusted to require positioning of the secondary winding 26 at any X.000 position, the four-inch portion of the primary winding 24 to the left of the tap selected by the switches S0–S6 will be energized by a 61 1/10 volt source and the four-inch portion to the right of the selected tap by a 38 9/10 volt source. It will be observed that the primary windings 2TP and 3TP are arranged to be connected between the T5 tap of the secondary winding 1TS and either to the T5–T10 taps or to the T5–T10 taps through switches C0–C9 and M0–M9. Thus when the proper switches C6–C9 and M6–M9 are closed, because of the polarities of the primary and secondary windings of transformers 2T and 3T, the voltage across the four-inch portion to the left of the tap 0–6 on the primary winding 24 will be less than 50 volts while the voltage across the four inch portion to the right will be correspondingly greater than 50 volts as to require positioning of the secondary winding between X.555 and X.999. Similarly when the switches C4–C0 and M4–M0 are closed, the four inch portion of the primary winding 24, to the left of the selected tap will be supplied with a voltage greater than 50 volts while the four-inch portion to the right will be supplied with a corresponding voltage of less than 50 volts so as to require positioning of the secondary winding between X.555 and X.000.

The transpofrmer 2T has a turns ratio of 10 to 1 and the transformer 3T has a turns ratio of 100 to 1. The voltage between each of the adjacent taps T1–T10 is two volts. Thus as the switches C6–C9 are successively closed the voltage output of the secondary windings of transformer 2T will successively increase in increments of 0.2 volt with the voltage having one polarity. Similarly when the switches C4–C0 are successively closed the voltage output of the secondary windings of transformer 2T will successively increase in increments of 0.2 volt with a voltage having a polarity opposite the voltage when switches C6–C9 were closed. As the transformer 3T has a ratio of 100 to 1, the closure of switches M6–M9 and M4–M0 will cause a similar polarity incremental voltage change of 0.02 volt as when the switches C6–C9 and C4–C0 were successively closed. Each incremental change as provided by the change in magnitude and polarities of the output voltage of the secondary windings of transformer 2T will require an incremental change in the positioning of the secondary winding 26 of 1/100 inch and each similar incremental change of the output voltage of transformer 3T will require an incremental change of 1/1000 inch of the secondary winding 26 relative to the machine 20. Further, as each incremental change is operative to increase the current on one four-inch portion of the primary winding 24 while decreasing the current flow in the other four-inch portion by an equal amount, it follows that any variations in the voltage of source 36 will be ineffective to change the ratios of the currents in the four inch portions of the primary winding 24.

It will be observed that the primary winding 4TP has one end connected to a slider which is movable along a Variac VT and that the secondary 4TSL and 4TSR are connected to either add or subtract from the voltage in the left and right four-inch portions of the primary winding 24. Thus if the slider is centered on the Variac, trans- former primary 4TP will not be energized. However, if the slider on the Variac is moved in either direction on the Variac, energizing currents in primary winding 4TP will cause the secondary windings 4TSL and 4TSR to change the current flows in the respective four inch portions of the primary winding to the left and right of any selected tap 0–6. This arrangement can be used to change the currents flowing at each of the selected taps of the primary winding 24 and cause a lateral shift in the position in either direction of all of the taps 0–6 at which the secondary winding 26 is required to be positioned to produce a zero output signal. Thus the energization of the transformer 4T may be used to provide a zero offset for the control system.

After the foregoing adjustments have been made, the positioning system is placed in condition for operation when the separate circuit to energize relays 80 and 90 is interrupted. When it is desired to position one of the parts of the machine, e.g., the spindle head 22, at a predetermined location relative to the machine 20, the desired location is used to adjust the switches of the system. If, for example, a random selected setting of 4.378 inches is desired, switches L4, S4 and R4 are closed to indicate a setting of four inches. The tenths switches V3 and X3 are closed. The switch A3 also closes with the tenths switches V3 and X3 to cause proper energization of transformer 6T to compensate for variations in the secondary winding 26 output signal. The hundredths switch C7 and the thousandths switch M8 are closed. The closed switch L4 connects tap F to junction 70. The closed switch S4 connects tap 4 to junction 34 and the closed switch R4 connects tap 0 to the junction 72. Thus the four inch portions to the left and right of the selected tap 4 are in condition to be energized when relays 80 and 90 are energized to complete the circuit to junctions 70 and 72. The closed switch V3 connects tap T3 of transformer 1T to lead 38. Thus the transformer 1T will supply a voltage of 54 volts between tap T13 and lead 38. The closed switch X3 connects tap T7 of transformer 1T to lead 40. Thus the transformer 1T will supply a voltage of 46 volts between tap T13 and lead 40. The hundredths switch C7 connects one end of the primary winding 2TP to tap T3 of the secondary winding 1TS. The other end of the primary winding 2TP is connected by lead 46 to tap T5 so that primary winding 2TP is energized by 4 volts and the secondary windings 2TSL and 2TSR will each have a 0.4 volt output. The thousandths switch M8 connects one end of the primary winding 3TP to tap T2 of the secondary winding 1TS. The other end of primary winding 3TP is connected to tap T5 by lead 46. Thus the primary winding 3TP will be supplied by a 6-volt source and the secondary windings 3TSL and 3TSR will each have a .06 volt output. The polarities of the windings of transformers 1T, 2T and 3T are arranged so that when switches C7 and M8 are closed the output voltages of secondary windings 2TSL and 3TSL will oppose the output of secondary winding 1TS to lead 38 and the output voltages of secondary windings 2TSR and 3TSR will add to the output voltage from secondary winding 1TS at lead 40. Thus the output voltage between lead 38 and tap T13 will be 54 volts less .46 volt or 53.54 volts and the output voltage between lead 40 and tap T13 will be 46 volts plus .46 volt or 46.46 volts.

Prior to the energization of relay 80, the lead 38 is connected to the end tap D of primary winding 24 by a series circuit which includes the lead 38, the secondary windings 2TSL, 3TSL, and 4TSL, the resistors R5 and R4, the junction 30, the closed switch contacts 82, and the junction 84. Prior to the energization of relay 90, the lead 40 is connected to the end tap N of the primary winding 24 by a series circuit which includes the lead 40, the secondary windings 2TSR, 3TSR, and 4TSR, the resistor R6, the junction 32, the closed switch contacts 92, the junction 94 and the resistor R9 which is in circuit with switch R0. The tap 4 of the primary winding 24 is connected to tap T13 of transformer secondary winding 1TS by a series circuit which includes closed switch S4, junction 34 and the secondary windings 5TS and 6TS. Thus at any one instant the polarities of end terminals D and N will be identical and be opposite to the polarity of the tap 4 on the primary winding 24. If we ignore the outputs of secondary windings 5TS and 6TS, the voltages between tap D and tap 4 will be 53.54 volts and between tap N and tap 4 will be 46.46 volts. If for explanation purposes, an instant of time is taken when taps D and N are both positive in polarity relative to tap 4, then current will flow from the end taps D and N toward the tap 4 which current flows will be proportionate to the ratio of the voltages between the end taps D and N and the selected tap 4.

The flow of currents from the end taps D and N to the selected tap 4 will cause a voltage output signal to be produced by the secondary winding 26, as shown in FIG. 4. When the secondary winding is electrically centered over the selected tap 4 the output voltage signal to the detector 42 will be zero as shown by point W on the curve in FIG. 4. When the secondary winding 26 is displaced to the left of the selected tap 4, then the output voltage signal of the secondary winding 26 will have one phase as illustrated by the portion of the curve W–Y. When the secondary winding is displaced to the right of the selected tap 4, the output voltage signal of the secondary winding 26 will be of the opposite phase, as indicated by the curve WZ. It will be seen that as the secondary winding approaches the selected tap 4, the magnitude of the output voltage signal decreases and crosses through zero as illustrated by the portions of the curve between the points B on the curve YW and points H on curve ZW.

The detector 42, which may be of any suitable well known type, is arranged to detect both the phase and magnitude of the voltage signal of the secondary winding 26 and in response thereto provide suitable output signals. If we assume the secondary winding 26 is positioned a considerable distance, i.e., to the left of the selected tap 4 and the switches are indexed to require a positioning at 4.378 inches as described, the output signal of the secondary winding 26 will have the phase of the curve WY and a magnitude shown by the portion of the curve WY to the left of point B. Under this condition the detector supplies a signal which causes relays 80 and 90 to be de-energized and the end taps D and N are both connected to the secondary winding 1TS through closed contacts 82 and 92. The detector 42 is also arranged to supply a suitable signal to the parts of the machine 20 which will cause a traverse of the spindle head 22 to move the secondary winding 26 toward the selected tap 4. When the secondary 26 is moved in the vicinity of the selected tap 4, the magnitude of the output signal from the secondary winding 26 decreases, as shown by the portion of the curve WY between point B and W. The detector 42 upon a predetermined decrease in magnitude of the output signal of the secondary winding 26, if desired, may supply a suitable signal to reduce the speed of traverse of the spindle head 22 and supplies a signal which causes relays 80 and 80 to be energized.

The relays 80 and 90 when energized cause the contacts 82 and 92 to open and contacts 78 and 88 to close. The resistors 74 and 76 are included in the circuits to reduce arcing across the contacts during the opening and closing of the contacts. It will be seen that before the relays 80 and 90 were energized, the primary winding was energized by current flow through circuits which included both end taps D and N and the current flows were in a direction which would cause the secondary winding 26 to provide an output signal voltage to the detector 42 which would cause the parts of the machine to traverse toward a desired position regardless of the initial position of the secondary winding 26 relative to the primary winding 24.

This may be termed "rough positioning," as when the various taps other than the center tap are selected, the primary winding will be divided into two unequal sections. For example, the selected tap 4.378 will cause the portion of the primary winding 24 to the left of the selected position 4.378 to be 5.622 inches long and the portion to the right to be 8.378 inches long. Thus the portions of the primary winding to the left and right of the selected tap will be unsymmetrical in length. These unsymmetrical lengths of the primary winding 24 will cause unsymmetrical circuit resistances and an inductive coupling between the primary winding 24 and secondary winding 26 which causes an error in the output signal of the secondary winding 26 which increases in proportion to the differences in the lengths of the portions of the primary winding 24.

When the relays 80 and 90 are energized, symmetrical switches L0–L6 and R0–R6 cause the sections of the primary to the right and left of the selected tap to be of equal length. The equal lengths of the sections to the right and left of the selected tap will eliminate the differences in resistance between the sections and the variations in inductive coupling between the sections of the primary winding 24 and the secondary winding 26 to minimize the error in the output signal of the secondary winding 26. Thus the system operates as a relatively inaccurate positioning system as the secondary winding 26 moves rapidly toward a desired location on the primary winding 24 and as an accurate positioning system when the secondary winding 26 approaches its final desired position relative to the primary winding 24.

In FIG. 2, the switches L0–L6 and R0–R6 were arranged to be closed in conjunction with switches S0–S6 to provide equal length portions of the primary winding 24 on opposite sides of a tap 0–6 selected by switches S0–S6. In the embodiment shown, the length of equal length portions of four inches is not necessarily critical although in the preferred embodiment the length of each portion should exceed one-half the overall length of secondary winding. In the embodiment shown, the five inch length of the secondary permits displacement of the secondary one half inch from the selected tap without electrically covering the taps on the opposite sides of the selected tap which are used to provide the equal length portions.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a positioning system, the combination comprising: an elongated primary winding having a terminal at each end and at least three taps spaced at equal intervals on the primary winding and located between the end terminals on the primary winding, a single phase alternating current source having a pair of sides of opposite polarity, circuit means connecting a centrally located one of the three spaced taps to one of the pair of sides of the source, means including a first pair of interruptable circuits connecting both of the end terminals of the primary winding to a side other than the said one side of the source, means including a second pair of completeable circuits connecting the two taps which are equally spaced on opposite sides of the said one tap to the said other side of the source, a secondary winding inductively coupled to the primary winding and movable relative thereto, said secondary winding having an alternating current induced therein when the primary winding is energized by the source and providing a null output signal when the secondary winding is in a predetermined position relative to the said one tap and an output signal having a potential phase depending on the displacement of the secondary winding relative to the said one tap, and means responsive to the output signal from the secondary winding for interrupting and de-energizing the first pair of circuits and completing and energizing the second pair of circuits when the output signal of the secondary winding is less than a predetermined value.

2. The combination as recited in claim 1 which includes a first means energized by the source and included in both of the second pair of circuits for increasing current flow in one of said pair of second circuits by a predetermined increment while equally decreasing current flow in the other of said pair of second circuits for changing the position relative to the primary winding whereat said secondary provides said null signal.

3. The combination as recited in claim 2 which includes a second means energized by the source and included in the circuit between the said one tap and the said one side of the source for varying current flow in both of said second pair of circuits for varying the changed position whereat the secondary winding provides said null signal.

4. The combination as recited in claim 1 which includes a second means energized by the source and included in the circuit between the said one tap and the said one side of the source for varying current flow in both of said pair of second circuits for varying the position relative to the primary winding whereat the secondary winding provides a predetermined null signal.

5. The combination as recited in claim 3 which includes an additional means included in both of the second circuits for increasing current flow in one of said second circuits and adjustable amount while equally decreasing the current flow in the other of said second circuits for causing an adjustable displacement of the varied changed position relative to the primary winding whereat the secondary winding provides said null signal to provide the positioning system with a zero offset control.

6. The combination as recited in claim 1 wherein an adjustable resistor is included in one of said second circuits for adjusting the ratio of current flow in said second circuits.

7. In a positioning system, the combination comprising: an elongated primary winding having a terminal at each end and a plurality of taps spaced at intervals along the primary winding between the end terminals, a single phase alternating current source having a pair of sides of opposite polarity, circuit means connecting any selected one of the taps to one of the pair of sides of the source, a first pair of circuits each connecting the side other than the said one side of the source to each of the end terminals, a secondary winding inductively coupled to the primary winding and movable relative thereto, said secondary winding having an overall length less than the primary winding and having an alternating current induced therein to provide a signal having a potential and phase which depends on the position of the secondary winding relative to the selected tap on the primary winding, means including a pair of relays having a pair of normally closed contacts and a pair of normally open contacts which pairs of contacts are arranged to respectively move to a circuit opening position and a circuit closing position upon energization of the relays, said normally closed contacts being included in said first pair of circuits for opening said first pair of circuits upon energization of the relays, a second pair of circuits each including a normally open contact of one of the relays connecting the said other side of the source to a pair of said taps which are spaced equidistantly on opposite sides of the selected tap and means responsive to the signal of the secondary winding for energizing the relays when the signal has a predetermined value.

8. In a positioning system, the combination comprising: an elongated primary winding having a terminal at each end and a plurality of taps spaced at equal intervals along the primary winding between the end terminals, said taps including a selected tap and a pair of taps equi- distantly spaced on opposite sides of the selected tap, a single phase alternating current source having a pair of sides of opposite polarity, circuit means including an actuatable switch means for selectively connecting one side of the source to both end terminals and to both of said pairs of taps, circuit means connecting the selected tap to a side other than the said one side of the source, a secondary winding inductively coupled to the primary winding and movable relative thereto, said secondary winding having an overall length less than the primary winding and having an alternating current induced therein to provide an output signal having a potential and phase which depends on the direction and magnitude of displacement of the secondary winding relative to the selected tap on the primary winding, and means responsive to the output signal of the secondary winding for actuating the switch means and connecting the pair of taps to the said one side of the source when the magnitude of the signal is less than a predetermined value.

9. In a positioning system, the combination comprising: an elongated primary winding having a terminal at each end and a plurality of taps spaced at equal intervals along the primary winding between the end terminals, said taps including a selected tap and a pair of taps equidistantly spaced on opposite sides of the selected tap, a single phase alternating current source having a pair of sides of opposite polarity, first circuit means including switch means for selectively connecting both end terminals and both of the pair of taps to one side of the source, second circuit means connecting the selected tap to a side other than the said one side of the source, a secondary winding inductively coupled to the primary winding and movable relative thereto, said secondary winding having an overall length less than the spacing between the pair of taps and having an alternating current induced therein to provide an output signal having a potential and phase which depends on the direction and magnitude of displacement of the secondary winding relative to the selected tap, and means responsive to the output signal for actuating the switch means for connecting the end terminals to the said one side when the magnitude of the output signal from the secondary winding exceeds a predetermined value and for connecting the pair of taps to the said one side when the magnitude of the output signal from the secondary winding is less than the predetermined value.

10. The combination as recited in claim 9 which includes means in circuit with the first circuit means energized by the source for incrementally increasing the flow of current at one of the pair of taps while equally decreasing the flow of current at the other of said pair of taps.

11. The combination as recited in claim 9 which includes a means energized by the source and connected in the second circuit means for equally varying the current flow at both of the pair of taps.

12. The combination as recited in claim 9 wherein the taps on the primary includes a tap centrally located between the end terminals and each of the taps between the centrally located tap and one of the end terminals is individually connected through an adjustable resistor and a contact of a multicontact switch means in the first circuit means to the said one side of the source.

References Cited

UNITED STATES PATENTS

| | | | |
|---|---|---|---|
| 2,962,652 | 11/1960 | Bulliet al al. | 323—53 |
| 3,004,200 | 10/1961 | Phillips | 323—43.5 X |
| 3,089,989 | 5/1963 | Rave | 323—43.5 X |
| 3,244,956 | 4/1966 | Mierendorf | 318—20.515 |
| 3,254,295 | 5/1966 | Vargo et al. | 323—43.5 |

JOHN F. COUCH, *Primary Examiner.*

A. D. PELLINEN, *Assistant Examiner.*